(12) United States Patent
Zhu et al.

(10) Patent No.: US 12,199,766 B2
(45) Date of Patent: Jan. 14, 2025

(54) DATA TRANSMISSION METHOD AND APPARATUS, COMMUNICATION DEVICE AND STORAGE MEDIUM

(71) Applicants: Beijing Xiaomi Mobile Software Co., Ltd., Beijing (CN); Beijing University of Posts and Telecommunications, Beijing (CN)

(72) Inventors: Yajun Zhu, Beijing (CN); Wei Hong, Beijing (CN); Lingyu Gao, Beijing (CN); Yong Li, Beijing (CN)

(73) Assignees: Beijing Xiaomi Mobile Software Co., Ltd., Beijing (CN); Beijing University of Posts and Telecommunications, Beijing (CN)

( * ) Notice: Subject to any disclaimer, the term of this patent is extended or adjusted under 35 U.S.C. 154(b) by 412 days.

(21) Appl. No.: 17/632,091

(22) PCT Filed: Aug. 2, 2019

(86) PCT No.: PCT/CN2019/099134
§ 371 (c)(1),
(2) Date: Feb. 1, 2022

(87) PCT Pub. No.: WO2021/022424
PCT Pub. Date: Feb. 11, 2021

(65) Prior Publication Data
US 2022/0278774 A1 Sep. 1, 2022

(51) Int. Cl.
*H04L 1/08* (2006.01)
*H04L 1/1812* (2023.01)
(52) U.S. Cl.
CPC .............. *H04L 1/08* (2013.01); *H04L 1/1812* (2013.01)

(58) Field of Classification Search
CPC ................................. H04L 1/08; H04L 1/1812
See application file for complete search history.

(56) References Cited

U.S. PATENT DOCUMENTS

2010/0100787 A1    4/2010  Zhang et al.
2018/0270022 A1*   9/2018  Sun ..................... H04L 1/1614
(Continued)

FOREIGN PATENT DOCUMENTS

CN          106888074 A     6/2017
CN          108111263 A     6/2018
(Continued)

OTHER PUBLICATIONS

Chinese Decision of Rejection issued on Feb. 28, 2022 for Chinese Patent Application No. 201980001628.4.
(Continued)

*Primary Examiner* — Jasper Kwoh
(74) *Attorney, Agent, or Firm* — Volpe Koenig

(57) ABSTRACT

A data transmission method is described that includes: receiving transmission feedback for one or more Code Block Groups (CBGs) from a receiver; transmitting one or more Transmission Blocks (TBs) based on the transmission feedback, wherein one of the one or more TBs comprises one or more retransmission CBGs and one or more initial transmission CBGs; in response to the one of the one or more TBs being an uplink transmission TB, obtaining, based on a correspondence between a number of the one or more retransmission CBGs carried by the one of the one or more TBs and scrambling sequences, scrambled information by scrambling a first check bit sequence, wherein the first check bit sequence is generated based on the transmission feedback and Uplink Control Information (UCI); and uplink-transmitting the UCI and the scrambled information.

17 Claims, 8 Drawing Sheets

(56) References Cited

U.S. PATENT DOCUMENTS

| | | | | |
|---|---|---|---|---|
| 2018/0270023 | A1* | 9/2018 | Jiang | H04L 1/0068 |
| 2019/0020444 | A1 | 1/2019 | Fröberg et al. | |
| 2019/0334664 | A1* | 10/2019 | Guan | H04L 5/0053 |
| 2020/0014491 | A1* | 1/2020 | Takeda | H04L 5/0055 |
| 2020/0059327 | A1* | 2/2020 | Kini | H04L 5/0055 |
| 2020/0170033 | A1* | 5/2020 | Gao | H04W 80/02 |
| 2020/0344009 | A1 | 10/2020 | Shao et al. | |
| 2020/0358564 | A1 | 11/2020 | Zhu et al. | |
| 2021/0314102 | A1* | 10/2021 | Li | H04L 1/1614 |

FOREIGN PATENT DOCUMENTS

| | | |
|---|---|---|
| CN | 108702254 A | 10/2018 |
| CN | 109152071 A | 1/2019 |
| CN | 110034848 A | 7/2019 |
| CN | 110034849 A | 7/2019 |

OTHER PUBLICATIONS

LG Electronics, "Remaining aspects of CBG based retransmission for NR", 3GPP TSG RAN WG1 Meeting #91, R1-1719931, Reno, USA, (Nov. 27-Dec. 1, 2017).

ISA State Intellectual Property Office of the People's Republic of China, Written Opinion of the International Searching Authority Issued on Apr. 24, 2020 for Application No. PCT/CN2019/099134.

State Intellectual Property Office of the People's Republic of China, Office Action and Search Report Issued in Application No. 2019800016284, Aug. 24, 2021, 17 pages. (Submitted with Machine/Partial Translation).

ISA State Intellectual Property Office of the People's Republic of China, International Search Report Issued in Application No. PCT/CN2019/099134, Apr. 24, 2020, WIPO, 6 pages.

Huawei et al.;. "Discussion on CBG construction;"3GPP TSG RAN WGJ Meeting #89, RI-1706963;, May 19, 2017 (May 19, 2017), 5 pages.

MediaTek Inc, R1-1702738,'On multiple HARQ bits per TB and feedback mechanism', 4 pages.

Qualcomm Incorporated, R1-1713446, 'DCI considerations for CBG-based (re)-Transmissions', 5 pages.

Huawei, HiSilicon, R1-1705066, 'Discussion on CBG-based feedback and retransmission', 4 pages.

Apple Inc, R1-1804771, 'Discussion on CBG based retransmissions', 5 pages.

Samsung, R1-1702990,'CB-group based retransmission for eMBB', 9 pages.

ZTE, R1-1708217 ,'DCI considerations for CBG transmission from two TBs', 5 pages.

3GPP TS38.214 (Release 15) v15.5.0. Physical layer procedures for data [S].Mar. 2019, 103 pages.

* cited by examiner

DATA TRANSMISSION METHOD AND APPARATUS, COMMUNICATION DEVICE AND STORAGE MEDIUM

CROSS REFERENCE TO RELATED APPLICATIONS

The present application is the U.S. national phase of PCT Application No. PCT/CN2019/099134 filed on Aug. 2, 2019, which is incorporated herein by reference in its entirety.

TECHNICAL FIELD

One or more embodiments of the present disclosure relate to wireless communication field but are not limited to the wireless communication field, and in particular, relate to a data transmission method and apparatus, a communication device and a storage medium.

BACKGROUND

In a Long Term Evolution (LTE) system, a Transmission Block (TB) is a basic unit of data transmission of a physical layer. One TB includes a plurality of Code Blocks (CBs) and the plurality of CBs may be further divided into different Code Block Groups (CBGs).

In a data transmission process, receiving data and feeding back data are performed with a CBG as a unit of data. In case a receiver fails to receive one or more CBs in a transmitted CBG, the CBG should be retransmitted. Research shows that prior art CBG retransmission techniques, while effective to retransmit CBs, nonetheless have drawbacks. The prior art techniques can inordinately consume resources, tend to have low effective resource utilization rates, and can incur large transmission delays.

SUMMARY

One or more embodiments of the present disclosure provide a data transmission method and apparatus, a communication device and a storage medium that overcome the drawbacks of prior art techniques.

According to a first aspect of embodiments of the present disclosure, there is provided a data transmission method, including: receiving transmission feedback for one or more Code Block Groups (CBGs); and transmitting one or more Transmission Blocks (TBs) based on the transmission feedback, wherein one of the TBs includes one or more retransmission CBGs and one or more initial transmission CBGs.

According to a second aspect of embodiments of the present disclosure, there is provided a data transmission method, including: transmitting transmission feedback for one or more Code Block Groups (CBGs); and receiving one or more Transmission Blocks (TBs) transmitted based on the transmission feedback, where one of the TBs includes one or more retransmission CBGs and one or more initial transmission CBGs.

According to a third aspect of embodiments of the present disclosure, there is provided a data transmission apparatus, including: a first receiving module, configured to receive transmission feedback for one or more Code Block Groups (CBGs); and a first transmitting module, configured to transmit one or more Transmission Blocks (TBs) based on the transmission feedback, where one of the TBs includes one or more retransmission CBGs and one or more initial transmission CBGs.

According to a fourth aspect of embodiments of the present disclosure, there is provided a data transmission apparatus, including: a second transmitting module, configured to transmit transmission feedback for one or more Code Block Groups (CBGs); and a second receiving module, configured to receive one or more Transmission Blocks (TBs) transmitted based on the transmission feedback, where one of the TBs includes one or more retransmission CBGs and one or more initial transmission CBGs.

According to a fifth aspect of embodiments of the present disclosure, there is provided a communication device, including: a transceiver; a memory; a processor connected to the transceiver and the memory respectively, and configured to, by executing computer executable instructions stored in the memory, control transmission and reception of the transceiver to thereby implement the method provided by the above first or second aspect.

According to a sixth aspect of embodiments of the present disclosure, there is provided a non-transitory computer readable storage medium storing computer executable instructions, where the computer executable instructions are executed by a processor to implement the method provided by the above first or second aspect.

In the technical solution provided by the embodiments of the present disclosure, after receiving transmission feedback regarding one or more CBG receive failures, a retransmission transmitter transmits a TB which may include one or more retransmission CBGs along with one or more initial transmission CBGs. When retransmission CBGs do not occupy all available CB slots of the TB, the unoccupied CB slots of the TB may be used for the initial transmission CBG(s), i.e., CBG(s) that have not yet been transmitted.

This is an alternative to a kind of 'pure' retransmission TB, i.e., a TB that is dedicated to carrying retransmission CBGs only. In that kind of dedicated TB, some CB slots may not be occupied. The retransmission approach described herein avoids unoccupied CB slots by filling them with retransmission CBGs, thereby saving transmission resources, reducing resource consumption for retransmission and improving effective resource utilization rate. Significantly, in the approach described herein there is no need to delay transmission of a retransmission TB until the number of retransmission CBG(s) is sufficient to fully occupy the TB, before performing retransmission. Thus, the approach provided by this disclosure increases the retransmission rate.

DETAILED DESCRIPTION OF THE EMBODIMENTS

Network architectures and service scenarios described in embodiments of the present disclosure clearly describe a range of examples implementing technical solutions provided by the embodiments of the present disclosure. These are exemplary only and are not intended to constitute limitations on the technical solutions provided by the embodiments of the present disclosure. Those skilled in the art will, upon reading this disclosure, recognize that, along with the evolution of network architectures and appearance of new service scenarios, the technical solutions provided by the embodiments of the present disclosure will be applicable to similar technical problems arising in these new service scenarios.

Figure 1:
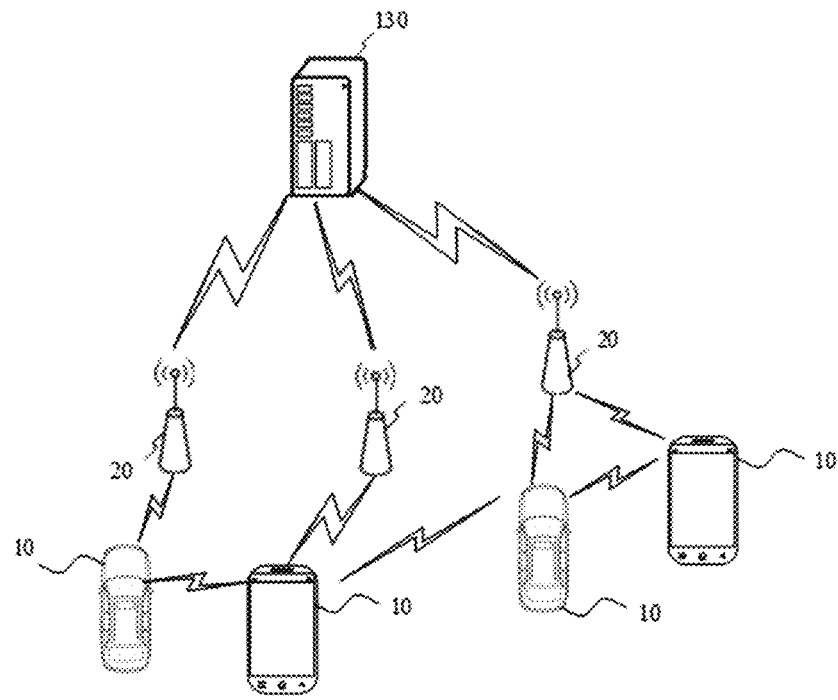
FIG. 1 is a structural schematic diagram illustrating a wireless communication system according to an embodiment of the present disclosure.

FIG. 1 is a structural schematic diagram illustrating a wireless communication system according to an embodiment of the present disclosure. As shown in FIG. 1, the wireless communication system is a communication system based on cellular mobile communication technology. The wireless communication system may include several terminals 10 and several base stations 20.

The terminal 10 may be a device providing voice and/or data connectivity to a user. The terminal 10 may communicate with one or more core networks through a Radio Access Network (RAN). The terminal 10 may be a terminal in Internet of Things (IoT), such as a sensor device, a mobile phone (also referred to as a cellular phone), and a computer comprising a terminal in an Internet of Things. Examples of such a computer or terminal include fixed, portable, pocket-size, handheld, or computer-inbuilt or vehicle-mounted apparatus. The terminal 10 may be, for example, a STAtion (STA), a subscriber unit, a subscriber station, a mobile station, a mobile, a remote station, an access point, a remote terminal, an access terminal, a user terminal, a user agent, a user device, or a user equipment. Optionally, the terminal 10 may also be a device carried on an unmanned aerial vehicle (UAV), or a vehicle-mounted device, for example, a trip computer having a wireless communication function, or a wireless communication device externally connected to a trip computer. Optionally, the terminal 10 may be a roadside device, for example, a road lamp, a signal lamp or other roadside device having a wireless communication function.

The base station 20 may be a network side device in the wireless communication system. The wireless communication system may be a 4th-generation mobile communication technology (4G) system, which is also referred to as a Long Term Evolution (LTE) system. Optionally, the wireless communication system may also be a 5G system, also referred to as New Radio (NR) system or 5G NR system. Optionally, the wireless communication system may also be a next generation system of a 5G system. An access network in a 5G system is also referred to as New Generation-Radio Access Network (NG-RAN).

The base station 20 may be an evolved Node B (eNB) base station deployed in the 4G system. Optionally, the base station 20 may also be a base station (gNB) adopting a centralized-distributed architecture in a 5G system. When adopting a centralized distributed architecture, the base station 20 can include a Central Unit (CU) and at least two Distributed Units (DUs). In the Central Unit, protocol stacks of a Packet Data Convergence Protocol (PDCP) layer, a Radio Link Control (RLC) layer and a Media Access Control (MAC) layer are disposed. In the Distributed Unit(s), a Physical (PHY) layer protocol stack is disposed. Specific implementations of the base station 20 are not limited in the embodiments of the present disclosure.

Wireless connection between the base station 20 and the terminal 10 may be established through an air interface. In different implementations, the air interface is an air interface based on a 4th-generation mobile communication network technology (4G) standard. Alternatively, the air interface can be an air interface based on a fifth generation mobile communication network technology (5G) standard, for example, the air interface can be a New Radio air interface; or, the air interface may also be an air interface based on standards of a next generation mobile communication network technology of 5G.

In some embodiments, End to End (E2E) connection may further be established between the terminals 10, for example, in the scenarios of Vehicle to Vehicle (V2V) communication, Vehicle to Infrastructure (V2I) communication, and Vehicle to Pedestrian (V2P) communication and the like in Vehicle to everything (V2X) communication.

In some embodiments, the above wireless communication system may further include a network management device 130. Several base stations 20 are connected to the network management device 130 respectively. The network management device 130 may be a core network device in the wireless communication system, for example, the network management device 130 may be a Mobility Management Entity (MME) in an Evolved Packet Core (EPC). Alternatively, the network management device may also be other core network device, such as Serving GateWay (SGW), Public Data Network GateWay (PGW), Policy and Charging Rules Function (PCRF), or Home Subscriber Server (HSS) and the like. The implementation topology of the network management device 130 is not limited in the embodiments of the present disclosure.

Figure 2:
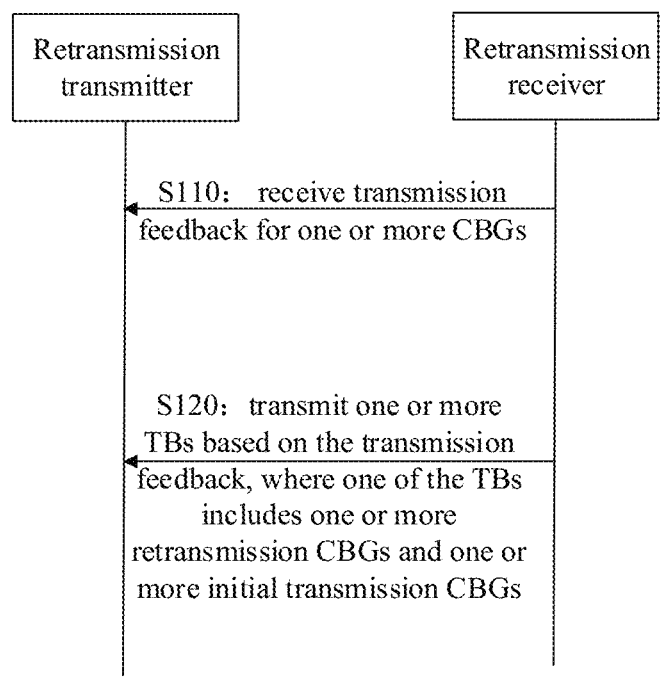
FIG. 2 is a flowchart illustrating a data transmission method according to an embodiment of the present disclosure.

As shown in FIG. 2, the present embodiment provides a data transmission method, which is applied to a retransmission transmitter. The method includes the following steps. At step S110, transmission feedback for one or more CBGs is received. At step S120, one or more TBs are transmitted based on the transmission feedback, where one of the TBs includes one or more retransmission CBGs and one or more initial transmission CBGs.

In the data transmission method provided by the present embodiment, after the transmission feedback for one or more CBGs is received, the receiver of the transmission feedback will be able to determine which CBG(s) is to be retransmitted. The data transmission method described herein may be applied to a retransmission transmitter. The retransmission transmitter may be a base station or a terminal. For example, when the retransmission transmitter is a base station, a retransmission receiver may be a terminal. When the retransmission transmitter is a terminal, the retransmission receiver may be a base station. Herein, the transmitter of the TB is referred to as the retransmission transmitter, or 'data transmitter'. The receiver of the TB is referred to herein as the retransmission receiver, or 'data receiver'.

In step S120, for retransmitting a CBG, a single TB to be transmitted with the retransmission CBG may include both the retransmission CBG and an initial transmission CBG. In other words, the TB carrying the retransmission CBG can also include an initial transmission CBG. The techniques and examples disclosed herein support a TB that can include both retransmission CBGs and initial transmission CBGs. Thus, scarce transmission spectrum resources are not wasted as they otherwise would be, when there are insufficient retransmitted CBG(s) to fully occupy one TB, and the TB is transmitted with empty slots. The approach described herein further conserves resources that would otherwise be consumed by additional CBG retransmissions, and it improves the effective resource utilization rate. Compared with the retransmission performed when the TB is delayed until the retransmitted CBGs are sufficient to fully occupy the TB, the retransmission rate provided by the examples herein is a significant improvement.

Figure 3:
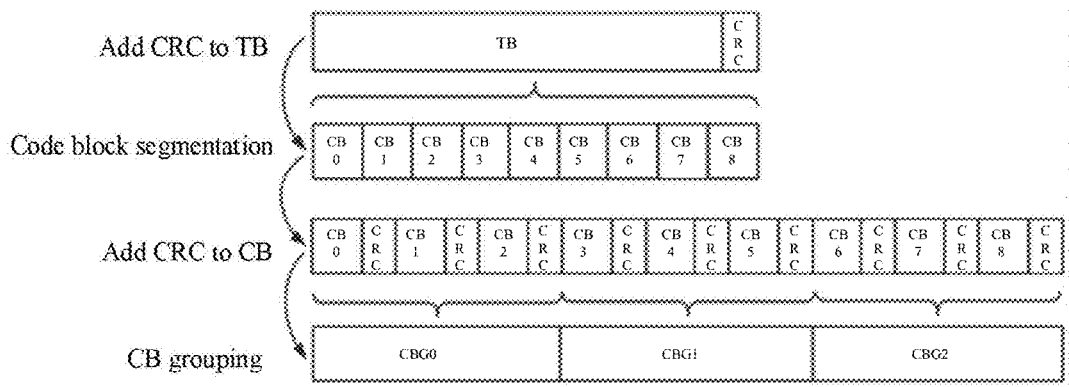
FIG. 3 is a schematic diagram illustrating a correspondence of a TB, a CB and a CBG.

FIG. 3 illustrates an association relationship of a TB, a CB and a CBG. One TB may include a plurality of CBs, and the plurality of CBs may be divided into different CBGs. The entire TB may include one Cyclic Redundancy Check (CRC). In FIG. 3, one TB is divided into three CBGs, i.e. CBG0, CBG1 and CBG2. In various implementations, the number of CBGs included in one TB can vary. For example, possible maximum numbers of CBGs in each TB may be 2, 4, 6 or 8.

Before data transmission, CBG division may be performed in the following manner. For grouping CBs into one or more CBGs, the number of CBGs and a Transmission Block Size (TBS) are determined firstly. This determines the number of CBs in the CBGs. For a TB of given size, with CBGs of a given number, the CBs should be distributed as uniformly as possible to the given number of CBGs. For example, the number of CBs included in any two CBGs should differ by 0 (no difference) or at most by 1. Or, for example, the number of CBs included in any two adjacent CBGs can differ by 0 (no difference) or at most by 1.

Figure 4:
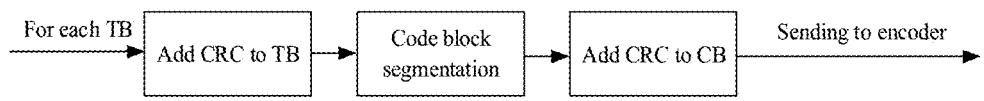
FIG. 4 is a flowchart of a method of forming a TB.

FIG. 4 illustrates a TB processing method, including: for each TB, adding a CRC to the TB; performing code block segmentation; adding a CRC to the CB; sending to an encoder.

Figure 5:
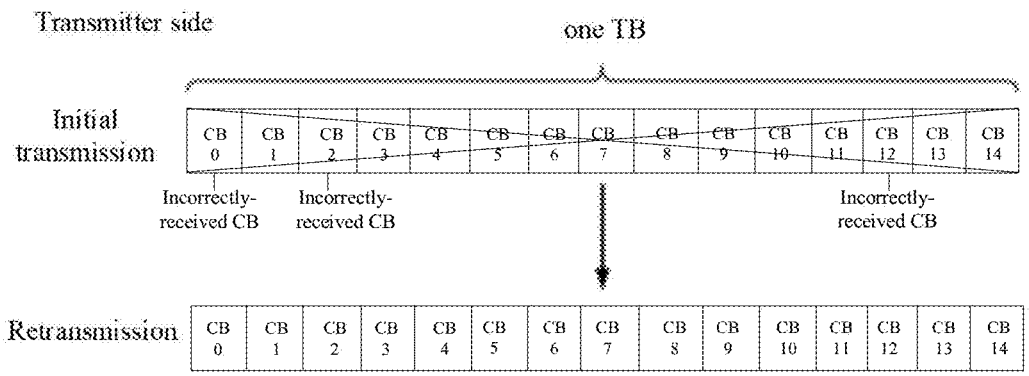
FIG. 5 illustrates a scheme for retransmission based on a TB.

As shown in FIG. 5, in case one or more CBs in one TB are received incorrectly and retransmission is to be performed based on TB, the entire TB needs to be retransmitted. In an embodiment of the present disclosure, after the TB is divided into a plurality of CBGs, transmission feedback of the entire TB is no longer fed back with a single bit indicator. For example, transmission feedback for one TB is no longer fed back with one bit such as a Hybrid Automatic Repeat reQuest (HARQ)-ACKnowledge (ACK) feedback bit. Instead, the number of HARQ-ACK feedback bits may be determined based on the number of configured CBGs, and each feedback bit functions to indicate feedback for a corresponding CBG separately. That is, if a receiver fails to correctly receive a certain TB, the receiver only feeds back Not ACKnowledge (NACK) for the CBG(s) received incorrectly, and a transmitter only needs to retransmit CBs in the CBG(s) transmitted incorrectly without needing to retransmit the entire TB. For the HARQ-ACK feedback based on CBG, retransmission efficiency and feedback cost may be balanced by configuring a CBG size.

Figure 6:
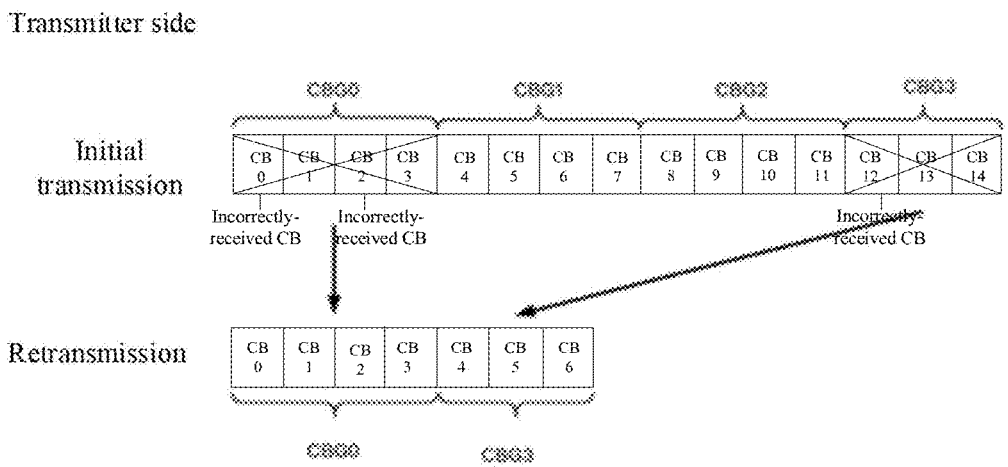
FIG. 6 illustrates a scheme for retransmission based on one or more CBG(s)

As shown in FIG. 6, the retransmission based on CBG may include the following. If one or more CBs in one CBG are received incorrectly, retransmission is performed only for the CBG having a reception error in a CBG as a unit. In FIG. 6, it is only necessary to retransmit CBG0 and CBG3 in CBG0 to CBG3.

In some embodiments, a TB carrying a retransmission CBG includes the same number of CBGs as a TB carrying an initial transmission CBG corresponding to the retransmission CBG. Thus, based on this stipulation, a retransmission receiver may determine the number of CBGs to be included in one TB, including the retransmission CBG(s) and the initial transmission CBG(s). However, in order to simplify the decoding of the receiver, in some embodiments, different TBs include a same number of CBGs.

The retransmission CBG included in one of the TBs and an initial transmission CBG corresponding to the retransmission CBG, are the same in their modulation and coding scheme (MCS) and/or code rate. In some embodiments, a retransmission CBG included in one TB and an initial transmission CBG corresponding to the retransmission CBG are the same in their MCS and code rate. In this way, the retransmission receiver may decode the corresponding retransmission CBG based on a decoding parameter for the initial transmission CBG.

In some embodiments, one TB should include an even number of CBGs. In the embodiments of the present disclosure, in a case of always enabling one TB to include only an even number of CBGs, e.g., in order to increase backward compatibility, one of the TBs can include an even number of retransmission CBGs and an even number of initial transmission CBGs. Alternatively, in some embodiments, one of the TBs can include an odd number of retransmission CBGs and an odd number of initial transmission CBGs. In both cases the total number of CBGs in the TB is an even number.

When one of the TBs includes an even number of retransmission CBGs and an even number of initial transmission CBGs, if an odd number of retransmission CBGs are to be transmitted, the TB can include two of the same retransmission CBGs, that is, one of the CBGs to be retransmitted is duplicated. The duplicated CBGs may be any one of the retransmission CBGs. In some embodiments, the two same retransmission CBGs may be a retransmission CBG of a predetermined position in the odd number of retransmission CBGs.

In this case, if an odd number of retransmission CBGs are to be transmitted, one of the retransmission CBGs is duplicated such that the TB including the retransmission CBG(s) and the initial transmission CBG(s) includes an even number of retransmission CBGs. At the same time, since one TB includes an even number of CBGs, after an even number for retransmission CBGs is subtracted, there will be an even number of initial transmission CBGs included in the TB. The duplicated CBG may correspond to any one of the retransmission CBG(s), for example, the first retransmission CBG in the retransmission CBG(s). In some embodiments, the two same retransmission CBGs may correspond to the last one of the odd number of retransmission CBGs.

In some embodiments, the method further includes: when the TB is an uplink transmission TB, based on a correspondence between numbers of retransmission CBGs carried by TBs and scrambling sequences, scrambled information is obtained by scrambling a first check bit sequence generated based on the retransmission feedback and Uplink Control Information (UCI); uplink-transmitting the UCI and the scrambled information, where the UCI and the scrambled information are used to indicate the number of retransmission CBGs included in the TB to a base station. The first check bit sequence may be a check bit sequence generated by a terminal through performing checking for the received retransmission feedback and the UCI with the CRC.

In the embodiments of the present disclosure, based on the correspondence between numbers of retransmission CBGs carried by TBs and scrambling sequences, a corresponding scrambling sequence is selected for scrambling the first check bit sequence such as CRC, thereby obtaining the scrambled information. The terminal transmits the UCI and the scrambled information to a base station, which is equivalent to implicitly indicating the number of retransmission CBGs carried by the TB.

When the terminal is transmitting a TB, it is possible that the TB includes one or more CBGs to be retransmitted as indicated by the retransmission feedback. In the present embodiment, the terminal uses a scrambling sequence, which corresponds to the number of CBGs carried in the TB based on the correspondence between numbers of CBGs carried by TBs and scrambling sequences, to scramble the UCI and the retransmission feedback, so as to obtain the scrambled information. Then, the terminal may transmit the scrambled UCI and the scrambled information.

In this case, after receiving the UCI and the scrambled information, the base station may obtain a descrambled second check bit sequence by descrambling the scrambled information with a scrambling sequence. If there are Y scrambling sequences, Y second check bit sequences may be obtained, where Y is a positive integer. At the same time, the base station may generate a third check bit sequence based on retransmission feedback stored by the base station itself and the received UCI.

When one of the Y second check bit sequences successfully matches the third check bit sequence bit by bit, the scrambled information is considered successfully descrambled. Furthermore, the base station may determine the scrambling sequence for correctly descrambling the scrambled information as a scrambling sequence in correspondence with retransmission CBGs data, and then obtain the number of retransmission CBGs included in the TB based on the correspondence. Thus, the TB is descrambled according to the number of retransmission CBGs.

Advantageously, when the number of retransmission CBGs is known to the base station, the base station may determine a retransmission candidate combination based on the retransmission feedback. The retransmission candidate combination may include a combination of initial transmission CBGs corresponding to the retransmission CBG(s) included in the TB. The retransmission candidate combination is used to decode the TB. For example, each retransmission CBG has a corresponding initial transmission CBG, and the initial transmission CBG is the same as a CBG which corresponds to the retransmission CBG and is transmitted for the first time. If the number of retransmission CBGs corresponds to the number of retransmission CBGs included in one TB, previously-received initial transmission CBGs may be combined based on the number of retransmission CBGs, so as to obtain one or more retransmission candidate combinations. Then the TB is decoded based on the MCS and code rate of the initial transmission CBGs in the retransmission candidate combination(s), so as to improve the decoding success rate of the TB.

For example, one TB includes four CBGs in total, and the number of retransmission CBGs indicates that one TB includes two retransmission CBGs. Before receiving the TB, the retransmission receiver receives four CBGs; and then the retransmission receiver may combine any two of the previously-received four CBGs. Assuming that the previously-received four CBGs are CBG a, CBG b, CBG c and CBG d, the following retransmission candidate combinations are obtained by performing paired combination.

CBG a, CBG b;
CBG b, CBG c;
CBG c, CBG d;
CBG a, CBG c
CBG a, CBG d;
CBG b, CBG d.

In this way, one retransmission candidate combination can be used one time for blind decoding. If the decoding is successful, it indicates that the retransmission transmitter transmits the TB using the corresponding retransmission candidate combination. Otherwise, decoding is performed using a next retransmission candidate combination, and the process repeats until the decoding is successful or all retransmission candidate combinations are traversed. Specifically, decoding using the corresponding retransmission candidate combination includes: decoding the TB using the MCS of the corresponding CBG in the retransmission candidate combination.

In some embodiments, if the scrambling sequence for correctly descrambling the scrambled information is not a scrambling sequence in correspondence with the number of retransmission CBGs, the base station may take the TB as an initial transmission TB. Herein, the term 'initial transmission TB' refers to a TB with all carried CBGs being initial transmission CBGs.

In some embodiments, the method further includes: when the TB is a downlink reception TB, Downlink Control Information (DCI) sent by a base station is transmitted, where the DCI includes retransmission information of the retransmission CBG(s) and/or initial transmission information of the initial transmission CBG(s) in the TB; the retransmission information includes: the number of the retransmission CBG(s) and/or a position of the retransmission CBG(s); the initial transmission information includes the number of the initial transmission CBG(s) and/or a position of the initial transmission CBG(s). Therefore, if the TB is a downlink reception TB, the terminal may receive a DCI sent by the base station for decoding a TB including the retransmission CBG(s) and the initial CBG(s), thus simplifying the decoding of the retransmission receiver.

In an embodiment of the present disclosure, the scrambled information may be CRC. In this embodiment, the UCI and the scrambled information may be uploaded before uploading the TB including the retransmission CBG and the initial transmission CBG. In some embodiments, the retransmission CBGs include a retransmission CBG retransmitted for an m-th time and a retransmission CBG retransmitted for an n-th time, where m and n are unequal, m is a positive integer and n is a positive integer.

In this embodiment, m and n can be unequal, which indicates that retransmission times corresponding to retransmission CBGs carried in one TB are different. For example, retransmission CBGs included in one TB may be a retransmission CBG retransmitted for the first time or a retransmission CBG retransmitted for the second time. In some embodiments, specific values of m and n are not greater than a maximum number of retransmissions. In some embodiments, the retransmission CBG(s) included in one TB is located before the initial transmission CBG(s).

In order to simplify the decoding of the receiver, for a TB including the retransmission CBG(s) and the initial transmission CBG(s), the retransmission CBG(s) may be carried in front of the TB in a centralized manner. In other embodiments, the retransmission CBG(s) and the initial transmission CBG(s) may also be carried in one TB in an alternating manner.

In some embodiments, the method further includes: when the TB is a downlink reception TB, Downlink Control Information (DCI) is transmitted, where the DCI includes retransmission information of the retransmission CBG(s) and/or initial transmission information of the initial transmission CBG(s); where the retransmission information includes: the number of the retransmission CBG(s) and/or a position of the retransmission CBG(s). The initial transmission information includes the number of the initial transmission CBG(s) and/or a position of the initial transmission CBG(s). The transmitted DCI may be used for a retransmission receiver (e.g. a terminal) to perform decoding for a TB including the retransmission CBG(s) and the initial transmission CBG(s).

Figure 7:
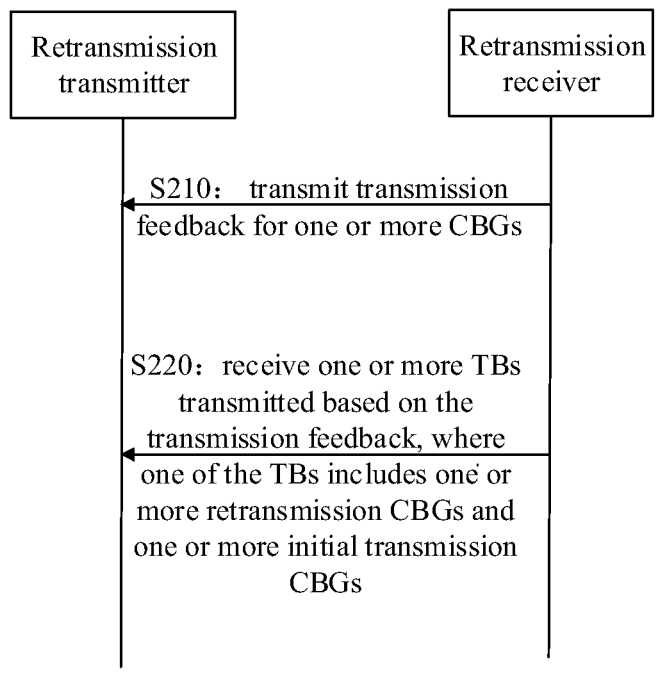
FIG. 7 is a flowchart illustrating another data transmission method according to an embodiment of the present disclosure.

As shown in FIG. 7, an embodiment of the present disclosure further provides a data transmission method which is applied to a retransmission receiver. The method includes the following steps. At step S210, transmission feedback for one or more Code Block Groups (CBGs) is transmitted. At step S220, one or more Transmission Blocks (TBs) transmitted based on the transmission feedback is received, where one of the TBs includes one or more retransmission CBGs and one or more initial transmission CBGs.

In the present embodiment, the data transmission method is performed by a retransmission receiver. The retransmission receiver may be a base station or a terminal. When the retransmission receiver is a base station, a retransmission transmitter may be a terminal; and when the retransmission receiver is a terminal, the retransmission transmitter may be a base station.

Transmission feedback for one or more CBGs is transmitted based on reception of a previous TB. For example, one CBG corresponds to one feedback bit. The feedback bit has two bit values of 0 and 1, which may be used to indicate one of two possible reception situations, i.e. successful reception and unsuccessful reception.

In the embodiments of the present disclosure, the received TB may include a retransmission CBG and an initial transmission CBG at the same time. Thus, when the retransmission CBG(s) is not sufficient to occupy one TB, an idle transmission resource in the TB may be used to transmit the initial transmission CBG(s), thereby conserving resources by reducing consumption of retransmission resources, and reducing retransmission delay due to waiting until a number of retransmission CBGs becomes sufficient to occupy one whole TB for retransmission.

In some embodiments, the method further includes: According to the transmission feedback, the retransmission CBG(s) included in the TB is determined. According to the number of CBGs and the retransmission CBG(s) included in the TB, the initial transmission CBG(s) included in the TB is determined. In the present disclosure, the retransmission receiver may determine which CBG(s) is included in the currently-received TB based on the transmission feedback fed back by the receiver itself, and may decode the retransmission CBG(s) based on one or more initial transmission CBGs corresponding to the retransmission CBG(s), thus simplifying the decoding.

In some embodiments, since the numbers of CBGs transmitted for different times are fixed, once the retransmission CBG(s) is determined, the number of initial transmission CBGs included in the TB may be obtained by subtracting the number of retransmission CBG(s) from a total number of CBGs in the TB. When the retransmission CBG(s) is decoded and output, the initial transmission CBG(s) in the received TB are decoded in combination with a size of the TB and a rule set for including one or more CBs in one CBG. In this way, the retransmission receiver may correctly decode a TB including one or more retransmission CBGs and one or more initial transmission CBGs at the same time.

In some embodiments, the method further includes: according to a modulation and coding scheme or a code rate of an initial transmission CBG corresponding to the retransmission CBG, the retransmission CBG is decoded. An initial transmission CBG corresponding to a retransmission CBG and the retransmission CBG have a same MCS or code rate, and thus the retransmission CBG may be decoded based on the same MCS.

One of the TBs includes an even number of retransmission CBGs and an even number of initial transmission CBGs. Alternatively, when an odd number of retransmission CBGs are to be transmitted, the TB includes an odd number of retransmission CBGs and an odd number of initial transmission CBGs. In some embodiments, the method further includes: when one of the TBs includes an even number of retransmission CBGs and an even number of initial transmission CBGs, if the retransmission feedback indicates an odd number of retransmission CBGs, the TB is determined as including two same retransmission CBGs.

For one of the TBs including an even number of retransmission CBGs and an even number of initial transmission CBGs, if the retransmission feedback indicates that an odd number of CBGs are to be transmitted, the retransmission receiver may automatically determine that the TB includes an even number of retransmission CBGs which are formed by transmitting one of the retransmission CBGs repeatedly. Thus, the repeatedly transmitted retransmission CBGs are two same CBGs which may be any one of the retransmission CBGs, or may be one CBG at a specified position of the retransmission CBGs in the TB. For example, the two same retransmission CBGs correspond to the first retransmission CBG, or the last retransmission CBG or a retransmission CBG at a middle position in the TB.

In some embodiments, when one of the TBs includes an even number of retransmission CBGs and an even number of initial transmission CBGs, in response to that the retransmission feedback indicates an odd number of retransmission CBGs, determining that the TB includes two same retransmission CBGs includes: when one of the TBs includes an even number of retransmission CBGs and an even number of initial transmission CBGs, in response to that the retransmission feedback indicates an odd number of retransmission CBGs, the last retransmission CBG in the TB is determined to be repeatedly transmitted two times. In the present embodiment, the two same CBGs indicate the last one of retransmission CBGs carried in one TB.

In some embodiments, the method further includes: when the TB is a downlink reception TB, Uplink Control Information (UCI) and scrambled information are received; one or more second check bit sequences are obtained by descrambling the scrambled information with one or more scrambling sequences; a third check bit sequence is obtained according to stored retransmission feedback and the UCI. When at least one of the second check bit sequences is consistent with the third check bit sequence, the scrambled information is determined to be correctly descrambled;

When a scrambling sequence for correctly descrambling the scrambled information is a scrambling sequence in correspondence with numbers of retransmission CBGs, the number of retransmission CBGs included in the TB is determined according to the scrambling sequence for correctly descrambling the scrambled information; and the TB is descrambled according to the number of retransmission CBGs.

For example, scrambling sequences in correspondence with numbers of retransmission CBGs include scrambling sequence 1 to scrambling sequence M. If the scrambling sequence for correctly descrambling the scrambled information is one of scrambling sequence 1 to scrambling sequence M, the number of retransmission CBG(s) included in the received TB is determined according to the correspondence between the scrambling sequence for correctly descrambling the scrambled information, and the number of retransmission CBGs; then, the TB is decoded based on the retransmission CBG data, where M is a positive integer not smaller than 2.

Specifically, descrambling the TB based on the number of retransmission CBG(s) includes: one or more retransmission candidate combinations are determined based on the number of retransmission CBGs, where the retransmission candidate combinations include a combination of one or more initial transmission CBGs corresponding to the one or more retransmission CBGs included in the TB; the TB is descrambled based on the retransmission candidate combinations. The method further includes: when the scrambling sequence for correctly descrambling the scrambled information is not a scrambling sequence in correspondence with numbers of retransmission CBGs, CBGs included in the received TB are determined to be all initial transmission CBGs.

For example, when the scrambling sequence for correctly descrambling the UCI is a scrambling sequence X other than any one of scrambling sequence 1 to scrambling sequence M, the currently-received TB is taken as not including a retransmission CBG and being an initial transmission TB. Herein, the scrambling may be performed in a cyclic scrambling manner, and the scrambled information and second scrambled information obtained both may be CRCs. Then, the scrambled information and the second scrambled information are compared. If the scrambled information and the second scrambled information are same, it indicates that a terminal correctly receives the transmission feedback. At this time, a base station may decode the TB including the retransmission CBG and the initial transmission CBG directly based on the transmission feedback transmitted thereof.

In some embodiments, in a case that the base station sends a plurality of retransmission feedback signals, for each of the plurality of retransmission feedback signals, one piece of second scrambled information is generated based on the retransmission feedback and the UCI. For matching the scrambled information and the second scrambled information, if one piece of second scrambled information matches successfully with one piece of scrambled information, the matching for the scrambled information and the second scrambled information is determined to be successful, and thus the TB may be decoded directly based on the transmission feedback.

In some embodiments, the method further includes: when the second scrambled information does not match the scrambled information, one or more retransmission candidate combinations are determined according to the number of retransmission CBGs carried in the UCI, where the retransmission candidate combinations include a combination of one or more initial transmission CBGs corresponding to the one or more retransmission CBGs included in the TB; the TB is decoded according to the one or more retransmission candidate combinations.

When the second scrambled information does not match with the scrambled information, since the UCI may carry the number of retransmission CBGs, the retransmission candidate combination(s) may be obtained by combining CBGs of a previous TB according to retransmission CBG data.

During decoding, each retransmission candidate combination is used to decode the TB until the TB is correctly decoded. For example, the retransmission candidate combinations have two candidate combinations. In response to determining that the TB is not correctly decoded using candidate combination 1, the retransmission CBG(s) in the TB is decoded using candidate combination 2. For example, UCI indicates that one retransmission CBG is to be transmitted and a previous TB includes M CBGs. In that case there are M retransmission candidate combinations, and the M retransmission candidate combinations are traversed for decoding the TB. For example, UCI indicates that N retransmission CBGs are to be transmitted and a previous TB includes M CBGs, then there are M retransmission candidate combinations, and one retransmission candidate combination includes N different CBGs among the M CBGs.

In some embodiments, the method further includes: when the TB is a downlink reception TB, Downlink Control Information (DCI) is received, where the DCI includes retransmission information of the one or more retransmission CBGs and/or initial transmission information of the one or more initial transmission CBGs in the TB; the retransmission information includes: the number of the one or more retransmission CBGs and/or positions of the one or more retransmission CBGs; the initial transmission information includes the number of the one or more initial transmission CBGs and/or a position of the one or more initial transmission CBGs; the TB is decoded according to the DCI.

As an example, a retransmission transmitter is a base station and a retransmission receiver is a terminal. The base station may send the retransmission information and/or the initial transmission information through DCI. In this way, the terminal may decode the received TB based on the DCI, thus simplifying the decoding of the terminal.

Figure 8:
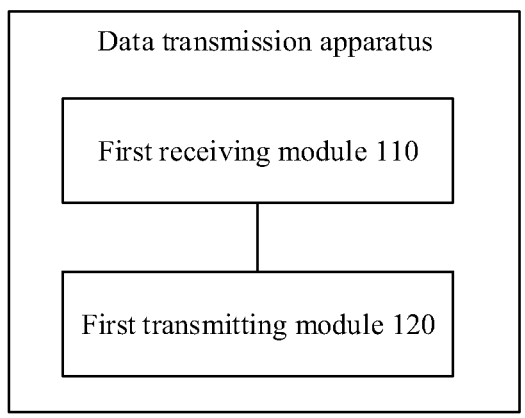
FIG. 8 is a structural schematic diagram illustrating a data transmission apparatus according to an embodiment of the present disclosure.

As shown in FIG. 8, there is provided a data transmission apparatus. The apparatus includes: a first receiving module 110, configured to receive transmission feedback for one or more Code Block Groups (CBGs); and a first transmitting module 120, configured to transmit one or more Transmission Blocks (TBs) based on the transmission feedback, where one of the TBs includes one or more retransmission CBGs and one or more initial transmission CBGs.

In some embodiments, the first receiving module 110 and the first transmitting module 120 may be program modules. The program modules may comprise processor-executable instructions to be executed by a processor to implement transmission feedback of CBG and a TB including a retransmission CBG and an initial transmission CBG.

In some other embodiments, the first receiving module 110 and the first transmitting module 120 may be software-hardware combination modules. The software-hardware combination module includes but is not limited to various programmable arrays; the programmable array includes but is not limited to complex programmable array or field programmable array.

In some other embodiments, the first receiving module 110 and the first transmitting module 120 may be pure hardware modules; the pure hardware module includes but is not limited to application specific integrated circuit.

In some embodiments, different TBs may include a same number of CBGs, and/or the retransmission CBG included in one of the TBs and an initial transmission CBG corresponding to the retransmission CBG are the same in their modulation and coding scheme and/or code rate. In some embodiments, one of the TBs includes an even number of retransmission CBGs and an even number of initial transmission CBGs. Alternatively, one of the TBs includes an odd number of retransmission CBGs and an odd number of initial transmission CBGs.

In some embodiments, when one of the TBs includes an even number of retransmission CBGs and an even number of initial transmission CBGs, if an odd number of retransmission CBGs are to be transmitted, the TB includes two of the same retransmission CBGs, where the two same retransmission CBGs are a retransmission CBG of a predetermined position in the odd number of retransmission CBGs. In some embodiments, the two same retransmission CBGs are the last one of the odd number of retransmission CBGs.

In some embodiments, the apparatus further includes: a scrambling module, configured to obtain, based on a correspondence between numbers of retransmission CBGs carried by TBs and scrambling sequences, scrambled information by scrambling a first check bit sequence generated based on the retransmission feedback and uplink control information (UCI); and a first transmitting module 120, configured to uplink-transmit the UCI and the scrambled information, where the UCI and the scrambled information are used to indicate the number of retransmission CBGs included in the TB to a base station.

In some embodiments, the first transmitting module is further configured to transmit, when the TB is a downlink reception TB, Downlink Control Information (DCI), where the DCI includes retransmission information of the one or more retransmission CBGs and/or initial transmission information of the one or more initial transmission CBGs. The retransmission information includes: the number of the one or more retransmission CBGs and/or positions of the one or more retransmission CBGs; the initial transmission information includes the number of the one or more initial transmission CBGs and/or positions of the one or more initial transmission CBGs.

In some embodiments, the retransmission CBGs include a retransmission CBG retransmitted for a m-th time and a retransmission CBG retransmitted for a n-th time, where m and n are unequal, m is a positive integer, and n is a positive integer. In some embodiments, the one or more retransmission CBGs are located before the one or more initial transmission CBGs included in one of the TBs.

Figure 9:
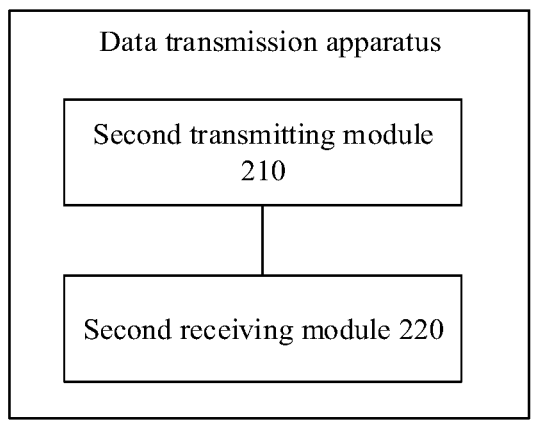
FIG. 9 is a structural schematic diagram illustrating another data transmission apparatus according to an embodiment of the present disclosure.

As shown in FIG. 9, an embodiment of the present disclosure further provides a data transmission apparatus. The apparatus includes: a second transmitting module 210, configured to transmit transmission feedback for one or more Code Block Groups (CBGs); a second receiving module 220, configured to receive one or more transmission blocks (TBs) transmitted based on the transmission feedback, where one of the TBs includes one or more retransmission CBGs and one or more initial transmission CBGs.

In some embodiments, the second transmitting module 210 and the second receiving module 220 may be program modules. The program modules may comprise processor-executable instructions that can be executed by a processor to configure the processor to perform functions of implementing transmitting transmission feedback of CBG and reception of a TB including a retransmission CBG and an initial transmission CBG.

In some other embodiments, the second transmitting module 210 and the second receiving module 220 may be software-hardware combination modules. The software-hardware combination modules can include but are not limited to various programmable arrays; the programmable arrays can include but are not limited to, complex programmable array or field programmable arrays.

In some other embodiments, the second transmitting module 210 and the second receiving module 220 may be pure hardware modules. The pure hardware modules can include but are not limited to application specific integrated circuits (ASICs).

In some embodiments, the apparatus further includes: a first determining module, configured to determine, according to the transmission feedback, the one or more retransmission CBGs included in the TB; and a second determining module, configured to determine, according to the number of CBGs included in the TB and the one or more retransmission CBGs, the one or more initial transmission CBGs included in the TB.

In some embodiments, the apparatus further includes: a first decoding module, configured to decode, according to a modulation and coding scheme or a code rate of an initial transmission CBG corresponding to the retransmission CBG, decode the retransmission CBG.

In some embodiments, one of the TBs includes an even number of retransmission CBGs and an even number of initial transmission CBGs; or, in some embodiments, one of the TBs includes an odd number of retransmission CBGs and an odd number of initial transmission CBGs.

In some embodiments, the apparatus further includes: a third determining module, configured to determine, when one of the TBs includes an even number of retransmission CBGs and an even number of initial transmission CBGs, in response to that the retransmission feedback indicates an odd number of retransmission CBGs, that the TB includes two same retransmission CBGs.

In some embodiments, the third determining module is configured to determine, when one of the TBs includes an even number of retransmission CBGs and an even number of initial transmission CBGs, in response to that the retransmission feedback indicates the odd number of retransmission CBGs, that the last retransmission CBG in the TB is transmitted two times.

In some embodiments, the second receiving module 220 is further configured to receive, when the TB is a downlink reception TB, Uplink Control Information (UCI) and scrambled information. The apparatus further includes: a descrambling module, configured to obtain one or more second check bit sequences by descrambling the scrambled information using one or more scrambling sequences; a generating module, configured to obtain a third check bit sequence according to stored retransmission feedback and the UCI; a matching confirming module, configured to determine, when at least one of the second check bit sequences is consistent with the third check bit sequence, that the scrambled information is correctly descrambled; a fourth determining module, configured to determine, when a scrambling sequence for correctly descrambling the scrambled information indicates a scrambling sequence in correspondence with numbers of retransmission CBGs, the number of retransmission CBGs included in the TB according to the scrambling sequence for correctly descrambling the scrambled information; and a second decoding module, configured to descramble the TB according to the number of retransmission CBGs.

In some embodiments, the second decoding module is configured to determine one or more retransmission candidate combinations based on the number of retransmission CBGs, wherein the retransmission candidate combinations include a combination of one or more initial transmission CBGs corresponding to the one or more retransmission CBGs included in the TB; and descramble the TB based on the one or more retransmission candidate combinations.

In some embodiments, the apparatus further includes: a fifth determining module, configured to determine, when the scrambling sequence for correctly descrambling the scrambled information is not a scrambling sequence in correspondence with numbers of retransmission CBGs, that CBGs included in the received TB are all initial transmission CBGs.

In some embodiments, the second receiving module 220 is further configured to, when the TB is a downlink reception TB, receive Downlink Control Information (DCI); the DCI includes retransmission information of the one or more retransmission CBGs and/or initial transmission information of the one or more initial transmission CBGs in the TB; where the retransmission information includes the number of the one or more retransmission CBGs and/or positions of the one or more retransmission CBGs; the initial transmission information includes the number of the one or more initial transmission CBGs and/or positions of the one or more initial transmission CBGs. The apparatus further includes: a decoding module, configured to decode the TB according to the DCI.

Several specific examples are provided below according to any one of the above embodiments.

Example 1

The present example provides a data transmission method, which is applied to a New Radio (NR) system. The data transmission method provided by the present example indicates a method which supports simultaneous transmitting retransmission data and initial transmission data in a same TB based on CBG.

In response to determining that data received by a receiver is incorrect, during HARQ retransmission, retransmitted data and newly-transmitted data are combined into one TB for transmission. In this solution, in case there is less retransmission data, a remaining resource may be used to transmit new data, thus improving the transmission efficiency.

The present example provides a complete method of simultaneous transmitting retransmission data and initial transmission data based on CBG, that is, a retransmission receiver combines the retransmission data and the initial transmission data in one TB for transmission. Further, the present example proposes that the following limiting conditions are to be satisfied for uplink and downlink transmissions: a total number of CBGs in each data transmission is fixed; a retransmission CBG and an initial transmission CBG corresponding to the retransmission CBG are the same in their modulation and coding scheme and code rate, such that each CBG in retransmission is completely the same as the corresponding CBG in initial transmission.

Further, in order to maintain backward compatibility with systems in which the number of CBGs can only be configured as an even number in an R15 protocol, when an odd number of CBGs are to be retransmitted, a retransmission transmitter will adopt a solution of transmitting the to-be-retransmitted last CBG and a duplicate of it to ensure that new data is divided into an even number of CBGs.

For an uplink transmission applying this solution, a terminal adopts an implicit scrambling manner and carries the received number of CBGs that should be retransmitted in UCI, such that a base station may determine whether the terminal correctly receives Code Block Group Transmission Information (CBGTI) transmitted by the base station, and thereby can retransmit data desired by the base station.

Example 2

The present disclosure provides a method of simultaneous transmitting retransmission data and initial transmission data based on CBG in a NR system. The method combines HARQ retransmission data and initial transmission data into one TB for transmission. When the method is applied to transmissions of UpLink (UL) and DownLink (DL), the following limiting conditions are to be satisfied. During data transmission, each TB includes a fixed number of CBGs; a retransmission CBG adopts a modulation and coding scheme and a code rate of an initial transmission CBG corresponding to the retransmission CBG. For uplink, additionally, an implicit scrambling manner is adopted, and a terminal carries the received number of CBGs should be retransmitted in the UCI.

Furthermore, in order to be backwards compatible with the protocol, when an odd number of CBGs are to be retransmitted, a retransmission transmitter may only transmit the to-be-retransmitted last CBG and a duplicate of it, thus ensuring that the total number of retransmission CBGs included in the TB is an even number.

For downlink in NR, a gNodeB (gNB) as a retransmission transmitter, transmits initial data to a terminal. The terminal may feedback the CBG where a CB received incorrectly is located over Physical Uplink Control CHannel (PUCCH) after receiving the data. After receiving the feedback, the gNB performs retransmission of the incorrect CBG and initial transmission of new data. At this time, the retransmission CBG is indicated using CBGTI in DCI, where New Data Indicator (NDI) in the DCI still uses one bit to indicate whether the entire TB involves retransmission data.

For uplink in a NR system, the terminal, as a retransmission transmitter, transmits initial data to the gNB. After receiving the data, the gNB may carry CBGTI in DCI transmitted to the terminal, so as to indicate a CBG which involves an incorrectly-received CB and is to be retransmitted, wherein NDI in the DCI still uses one bit to indicate whether the entire TB is to be retransmitted.

After receiving the CBGTI, the terminal performs retransmission of the incorrect CBG and initial transmission of new data to the gNB based on corresponding indication. It is assumed that a TB is divided into 15 CBs which form four CBGs. In a case that the present solution is to be applied to the uplink and downlink, the following limiting conditions are to be added. A total number of CBGs in each data transmission is fixed; a retransmission CBG and an initial transmission CBG corresponding to the retransmission CBG are the same in their modulation and coding scheme and code rate, such that each CBG in retransmission is completely the same as the corresponding CBG in initial transmission.

In DL, when a bit of the corresponding CBGTI (a kind of transmission feedback for CBG) is set to "1", it indicates that the CBG in the present transmission is retransmitted, and when the bit of the corresponding CBGTI is set to "0", it indicates that the CBG is not transmitted. In case the retransmission CBGs and the initial transmission CBGs are carried in one TB for transmission, the function of CBGTI in R15 protocol can be still retained.

Figure 10:
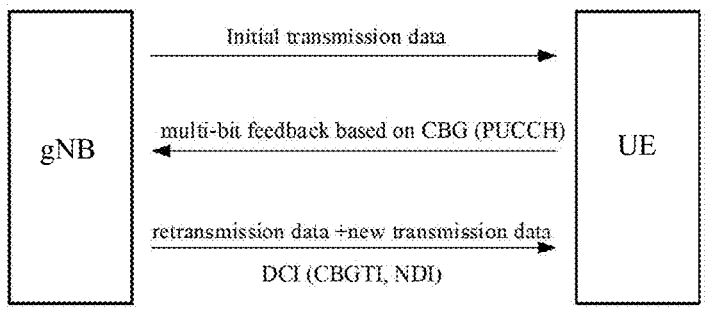
FIG. 10 is a flowchart illustrating another data transmission method according to an embodiment of the present disclosure.

As shown in FIG. 10, when the gNB transmits initial data to the terminal (UE), the terminal performs multi-bit feedback to the gNB over PUCCH. The gNB performs combination transmission for data incorrectly received by the terminal and new data, that is, one or more retransmission CBGs and one or more initial transmission CBGs are carried in one TB. The retransmission CBG(s) carries retransmission data and the initial transmission CBG(s) carries new data to be transmitted. In a specific implementation, the base station sends CBGTI and New Data Indicator (NDI) through Downlink Control Information (DCI).

Figure 11:
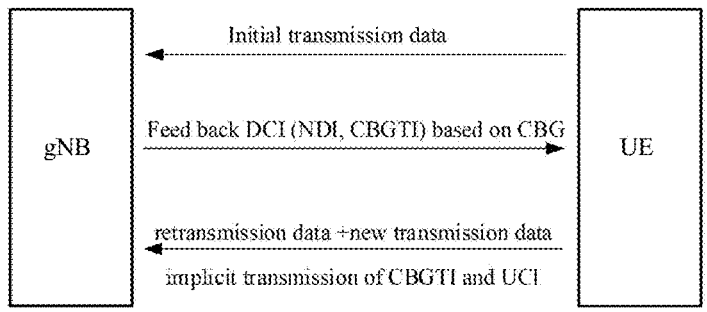
FIG. 11 is a flowchart illustrating still another data transmission method according to an embodiment of the present disclosure.

As shown in FIG. 11, when the UE transmits initial data to the gNB, for the transmission of the terminal, the gNB performs multi-bit feedback in DCI over a Physical Downlink Control CHannel (PDCCH). The terminal again performs combination transmission for data incorrectly received by the base station and new data, that is, one or more retransmission CBGs and one or more initial transmission CBGs are carried in one TB. The retransmission CBG(s) carries retransmission data and the initial transmission CBG(s) carries new data to be transmitted. In a specific implementation, the base station sends CBGTI and New Data Indicator (NDI) through Downlink Control Information (DCI). The DCI may include NDI and CBGTI. Further, by use of implicit scrambling, the UE may implicitly transmit feedback for reception of the CBGTI sent by the base station.

Figure 12:
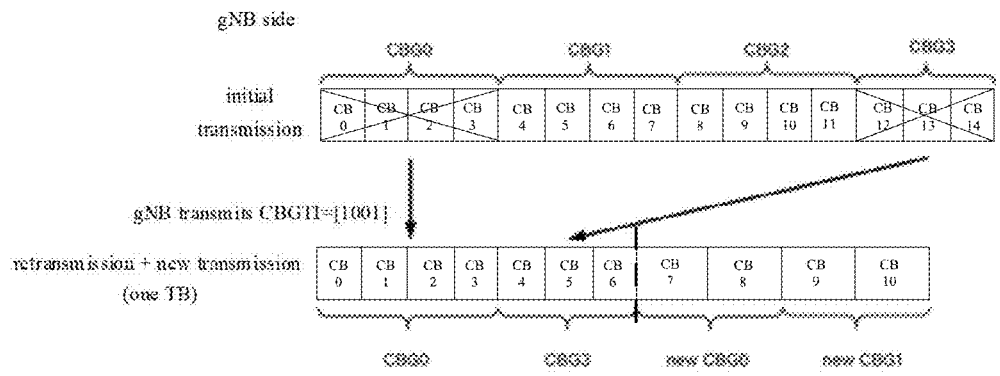
FIG. 12 illustrates a composition of a retransmission CBG and an initial transmission CBG according to an embodiment of the present disclosure.
Figure 13:
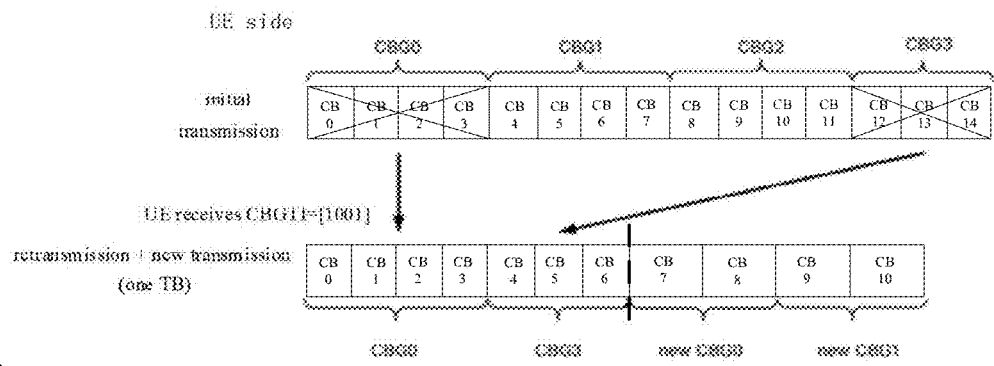
FIG. 13 illustrates another composition of a retransmission CBG and an initial transmission CBG according to an embodiment of the present disclosure.

As shown in FIGS. 12 and 13, when the terminal (UE) receives a bit sequence, the CBGTI field in the DCI transmitted by the gNB should carry 1001. Therefore, the terminal is informed that the gNB retransmits two CBGs, CBG0 and CBG3 at this time, and the two CBGs involve the contents fed back previously by the terminal itself. That is, the two CBGs were previously received unsuccessfully and are desired to be received again. Since the retransmitted CBG(s) has the same size as the initial transmission CBG(s), the terminal knows specific numbers of bits of the CBG0 and CBG3 (for example, M). The terminal takes the first M bits of the received bit sequence as the content of the CBG(s) retransmitted.

Further, because total numbers of CBGs in combination transmissions are invariable, the terminal knows that the present TB includes the same number of CBGs as the initial transmission, i.e. four CBGs. Since there are two CBGs determined as retransmitted CBGs for previous transmission, the subsequent bit sequence can be determined as involving two new CBGs. For dividing initial transmission CBGs, calculations may be performed based on a total length of new data (a total TB length minus a length of retransmission data) and the number of initial transmission CBGs. In this solution, the lengths of CBs and CBGs for the new data before and after rate matching are not necessarily same as that of the retransmission data in the front part.

For dividing new data into CBs, a retransmission receiver will perform division by dividing CBs in the protocol based on a size of the new data. For the division manner, the gNB and the terminal may know the same CBG division manner. At this time, the terminal only needs to determine a boundary position between old data and the new data.

Generally, the terminal can determine which CBG(s) in the initial transmission is retransmitted by the gNB based on the received CBGTI (and whether they are expected by the terminal itself) and then determine which bits are for the newly-transmitted CBG(s) based on a total size of the received TB, a size of retransmission CBG(s) and the number of initial transmission CBG(s). Thus, combination or discarding of a corresponding CBG is performed for the received retransmission data, and then the new data is cached temporarily.

In UL, in addition to basing the UL transmission on the same limiting conditions as those of the downlink transmission, how the terminal notifies the gNB of which CBG(s) were retransmitted by itself during data retransmission should also be considered, such that the gNB can ensure that the CBGTI received by the terminal is correct. Further, the base station may determine a boundary between the retransmission data and the initial transmission data in the new TB according to previous reception thereof.

Figure 14:
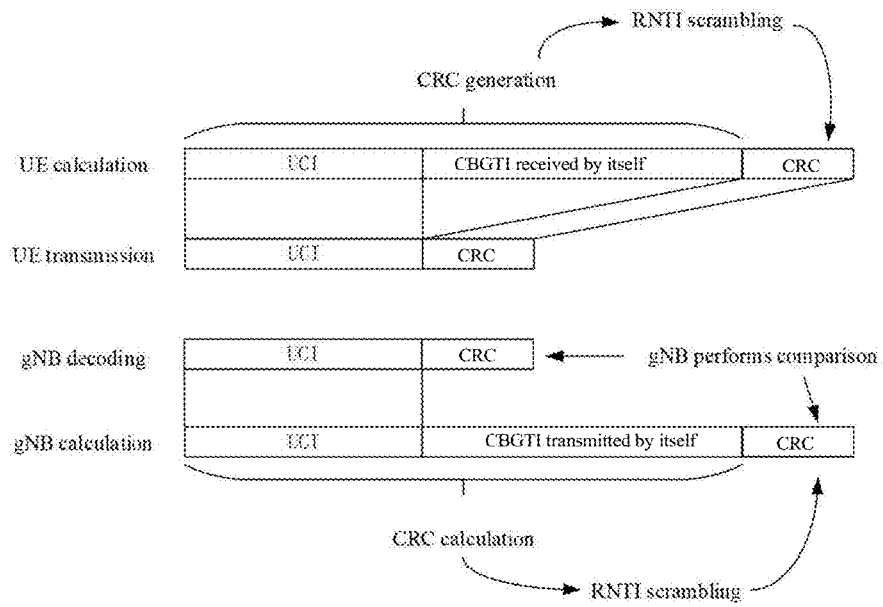
FIG. 14 illustrates reception of transmission feedback sent and indicated implicitly by a base station according to an embodiment of the present disclosure.

FIG. 14 is a schematic diagram of a scheme for implicitly indicating whether a terminal correctly receives transmission feedback. In this scheme, the terminal notifies the gNB in an implicit manner, specifically, by scrambling CRC of Physical Uplink Control CHannel (PUCCH).

For UL, the terminal firstly performs initial transmission of data. The gNB notifies the terminal of one or more CBGs to be retransmitted through carried CBGTI. In CBGTI, a value of a bit corresponding to the CBG to be transmitted is set to "1" and values of other bits are set to "0". The terminal firstly connects the received CBGTI with the UCI to generate a CRC of connected bits, and then scrambles the CRC using RNTI of the terminal. Only the UCI and the scrambled CRC are transmitted to the gNB.

The gNB decodes the UCI and the scrambled CRC, generates a local copy of the CRC by decoding the UCI based on a sequence associated with the previously-transmitted CBGTI bits, and compares the local copy with the received CRC. If the local copy matches the received CRC, the gNB may infer that the terminal correctly receives the CBGTI indication at a high probability and the gNB may continue receiving retransmission data.

During the descrambling process, the descrambling may be performed using a Radio Network Temporary Identity (RNTI) of the terminal. In a case that the local copy does not match the received CRC, it indicates that contents retransmitted by the terminal are incorrect, and the gNB has to discard the contents transmitted by the terminal in this instance.

When transmitting the retransmission data and the initial transmission data together, it may happen that the gNB loses newly-transmitted data. Therefore, information indicating the number of CBGs (possibly 0-8, for example, 2) retransmitted by the terminal in the present transmission is carried in UCI. In this way, in a case of finding the retransmission of the terminal is incorrect, the gNB attempts to descramble the UCI by using CBGTI formed by all possible CBG combinations (if the total number is 4 and the terminal notifies the base station that two are transmitted, thus there will be six possibilities), until correct descrambling is realized with a correct combination. Because the size of the corresponding CBG is same as that of the initial transmission, the gNB will know which CBG(s) is retransmitted by the terminal currently and the corresponding bits, thus knowing the boundary between the retransmission data and the new data. The gNB selects its desired data for combination in retransmission and discards other data, and receives the subsequent new data at the same time. In this solution, indicating the number of retransmission CBGs requires 3 bits at most, thus reducing the overhead compared with carrying CBGTI (8 bits).

Figure 15:
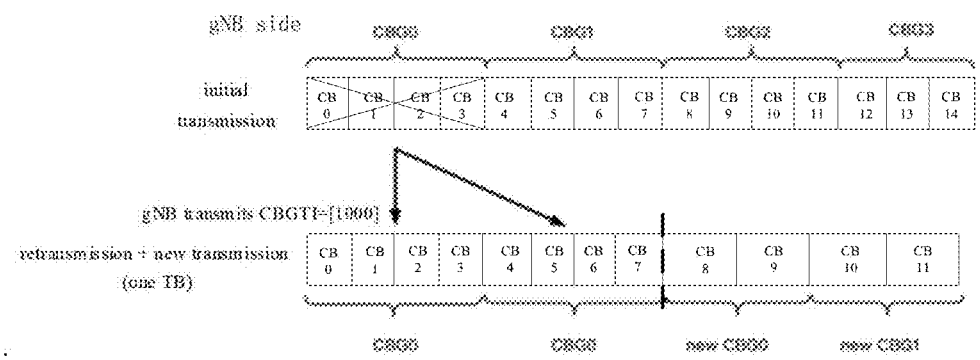
FIG. 15 illustrates another composition of a retransmission CBG and an initial transmission CBG according to an embodiment of the present disclosure.
Figure 16:
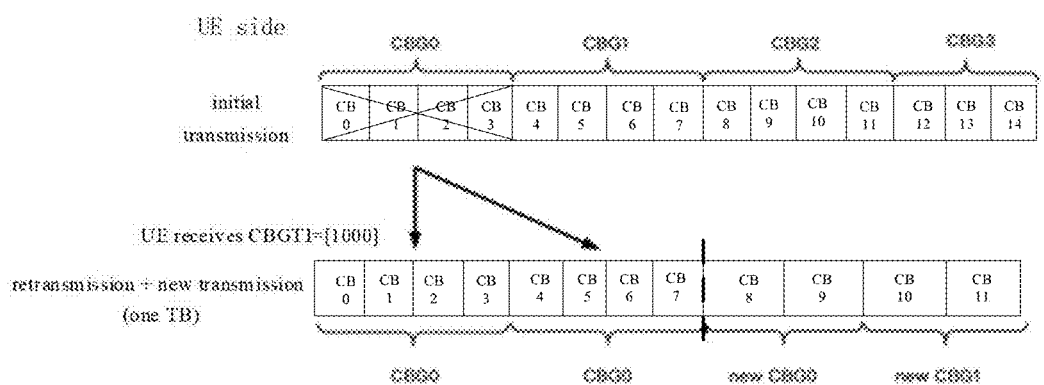
FIG. 16 illustrates yet another composition of a retransmission CBG and an initial transmission CBG according to an embodiment of the present disclosure.

As shown in FIGS. 15 and 16, when an odd number of CBGs are incorrectly transmitted in the UL and DL transmissions, examples of behaviors of a retransmission transmitter according to the present disclosure are illustrated. In the illustrated protocol, a maximum number of configurable CBGs in each TB may be 2, 4, 6 and 8, that is, the number can only be an even number. In a case that a solution of combining retransmission data and initial transmission data into one TB for transmission is applied. If there are an odd number of retransmission CBGs and there is a limiting condition that the total number of CBGs (an even number) is invariable for each transmission, an odd number of new CBGs may be obtained by directly dividing CBGs for the initial transmission data, which does not satisfy the condition that the number of CBGs should be an even number. Thus, some rules need to be set for solving this problem and enabling the terminal and the gNB to have a common understanding.

A manner of supplementing the number of retransmission CBGs to an even number includes specifically transmitting the last CBG in the retransmission two times, thereby ensuring the number of CBGs in each retransmission is always an even number. In this case, CBG division is performed for the new data. It is noted that, when this happens, the CBGTI only needs to indicate the odd number of actually incorrect CBGs. When the terminal receives the CBGTI including an odd number of bits of 1, the terminal may firstly divide the first odd number of actually incorrect CBGs based on the indication of the CBGTI, and then process corresponding bits after these CBGs into retransmission data based on the last incorrect CBG. In this manner, a case in which the new data must be divided into an odd number will not occur.

In DL, as shown in FIG. 15, for example, one CBG is incorrectly transmitted initially. In a first combination transmission, the gNB transmits the incorrect CBG one more time to form two retransmission CBGs. At this time, the transmitted CBGTI still indicates 1000. For the retransmission receiver, the terminal may, under the rule, identify that the CBGTI only includes one incorrect CBG (M bits), and may regard bits of first M+1 to 2*M as the last CBG of the incorrect CBGs transmitted one more time. In this way, in a case that a total number of CBGs for each transmission is fixed, the new data may also be divided into an even number of CBGs, which complies with stipulations of the protocol.

In UL, when an odd number of CBGs are incorrectly transmitted, the retransmission transmitter may adopt the same processing manner. When this occurs, in CBGTI, the odd number of actually incorrect CBGs to be retransmitted by the terminal is still set to 1. At the retransmission transmitter, in response to the terminal receiving the CBGTI including an odd number bits of 1, the last incorrect CBG is transmitted two times to form an even number of retransmission CBGs and new data is added during transmission. Implicit scrambling is performed for the UCI using CBGTI received by itself, and the number of the actually incorrect CBGs is indicated. At the retransmission receiver, the gNB may firstly divide the first odd number of actually incorrect CBGs based on CBGTI previously-transmitted by itself, and then process corresponding bits after these CBGs into retransmission data based on the last incorrect CBG, and then perform CB and CBG division for the subsequent bits as new data.

In FIG. 16, when the gNB receives data, the CBGTI transmitted to the terminal indicates 1000. After receiving the CBGTI, the terminal identifies that only an odd number bits set to 1 are included. In that case, the CBG0 is transmitted one more time and new data is added during the transmission.

When receiving a bit sequence transmitted in combination, the gNB still adopts CBGTI of 1000 previously-transmitted by the gNB itself to perform descrambling. If the gNB performs the descrambling correctly, the gNB knows what transmitted by the terminal is desired by itself. Meanwhile, the CBGTI for the gNB to perform correct descrambling indicates 1000 and includes an odd number bits of 1, thus the gNB knows that the policy with which the terminal performs repeated transmission, and thinks that the first 2*M bits of the received bit sequence are retransmission data, and regards the subsequent bits as new data.

If the gNB performs descrambling incorrectly, the gNB performs iterative descrambling trying a plurality of possible CBGTI based on the number of incorrect CBGs carried in the UCI and received by the terminal, until correct descrambling is achieved. Thus, the CBGs which are actually retransmitted by the terminal are known. In a case that the CBGTI adopted for the correct descrambling includes an even number bits set to 1, the corresponding CBGs are the data to be truly retransmitted by the terminal. In a case that the CBGTI adopted for the correct descrambling includes an odd number bits set to 1, the gNB will think that the terminal retransmits the last incorrect CBG. Based on this rule, the gNB may also know the data actually retransmitted by the terminal. In this way, the remaining new data is divided.

Figure 17:
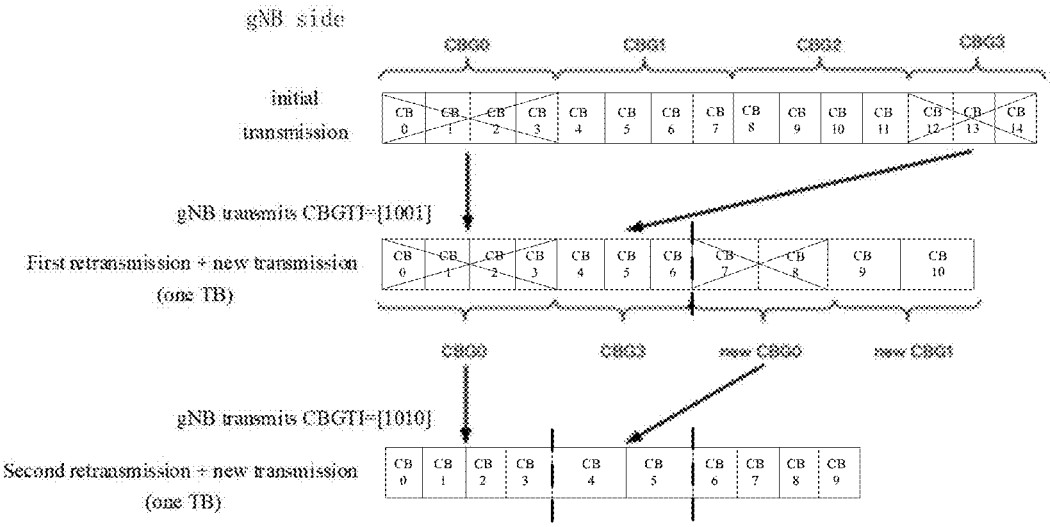
FIG. 17 illustrates still another composition of a retransmission CBG and an initial transmission CBG according to an embodiment of the present disclosure.
Figure 18:
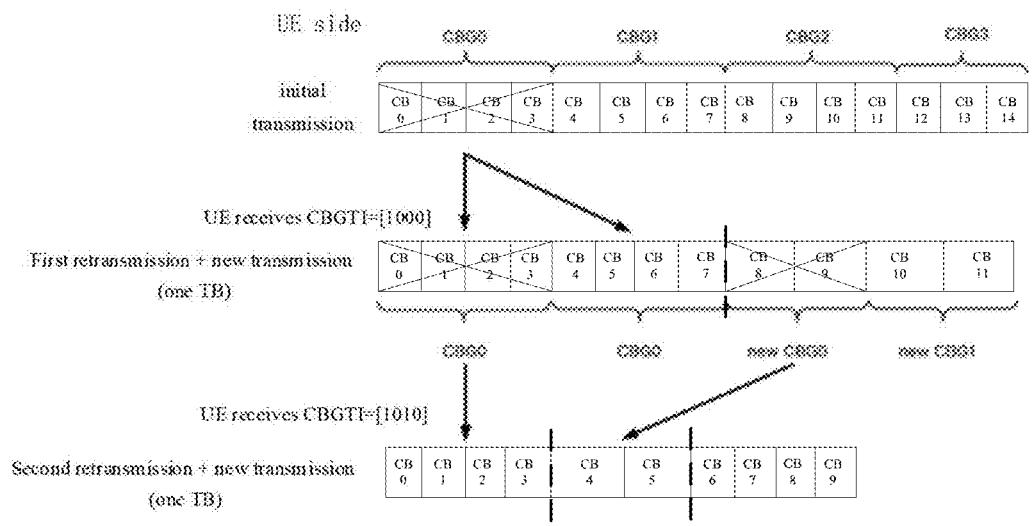
FIG. 18 illustrates a composition of TB carrying CBGs transmitted two times according to an embodiment of the present disclosure.

As shown in FIGS. 17 and 18, examples of behaviors of a retransmission transmitter performing secondary retransmission in DL and UL according to the present disclosure are illustrated. In a case that, for a first combination transmission, the retransmission receiver feeds back a reception error of retransmission data again, and also an error for new data, a next combination transmission will include the data to be retransmitted once more along with the new data. In this case, for DL, CBGTI still provides indications based on the reception of CBGs in a previous transmission. In a second combination transmission, CBGTI indicates 1010, which means first and third CBGs in the previous transmission are being retransmitted, and lengths of the two retransmission CBGs after rate matching should be the same as that of respective initial transmissions. For the terminal, the terminal knows the sizes of the CBGs in a first part of the retransmission data and a second part of the retransmission data. Thus, for received bits, the parts of retransmission 1 and retransmission 2 may be separated and the subsequent remaining new bits are new data.

For UL, FIG. 18 illustrates an example in which one CBG is incorrectly transmitted for the first time. In the second combination transmission, CBGTI indicates 1010. At the gNB, the gNB knows sizes of CBGs in a first part of retransmission data and a second part of retransmission data. For received bits, retransmission 1 and retransmission 2 may be separated and the subsequent remaining new bits are new data. In the secondary transmission, the number of retransmissions for this transmission and carried in the UCI by the terminal is still 2, and the terminal performs implicit scrambling with the CBGTI received by the terminal. The gNB performs implicit descrambling using the CBGTI transmitted by itself for the second time. The entire solution is identical to that of the first combination transmission, which brings no new problems.

For DL and UL, the transmission solution in which the number of incorrect CBGs processed is an odd number as shown in FIG. 16, is also applicable to such secondary transmission. It is noted that, as shown in FIG. 18, if one or more CBGs transmitted one more time in the first combination transmission are still not received correctly, it is necessary to transmit them one time in the second combination transmission. At this time, the CBGTI indicates 1000, and the retransmission transmitter still generally performs transmission based on the principle in which, in a case of an odd number of incorrect CBGs, the last CBG is transmitted one more time.

A communication device provided by the embodiments of the present disclosure includes a transceiver, a memory and a processor. The transceiver is used to interact with other devices and the transceiver includes but is not limited to a transceiver antenna. The memory may store computer executable instructions. The processor is connected with the transceiver and the memory respectively to implement the data transmission method according to any one of the above technical solutions.

Figure 19:
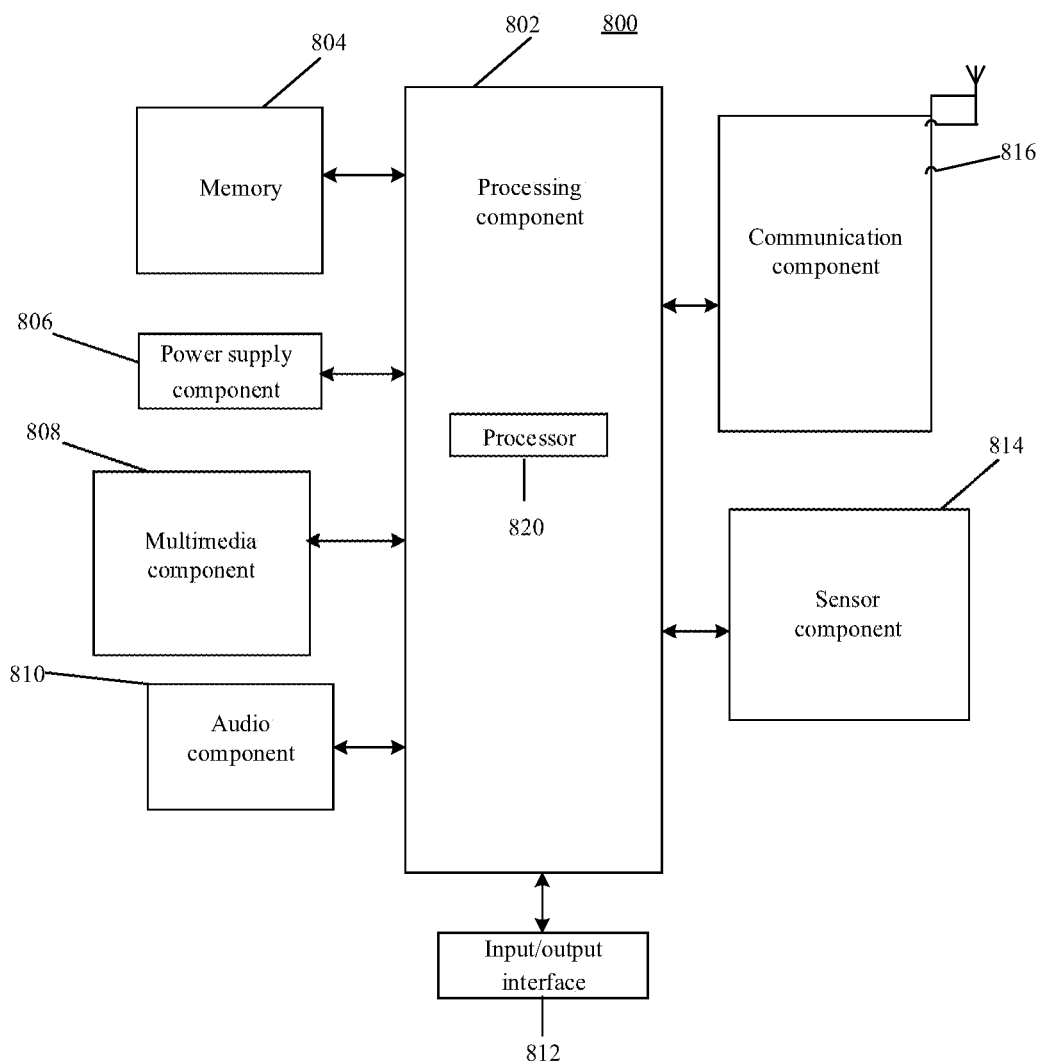
FIG. 19 is a structural schematic diagram illustrating a terminal according to an embodiment of the present disclosure.

FIG. 19 illustrates a terminal according to an embodiment of the present disclosure. Specifically, the terminal may be a mobile phone, a computer, a digital broadcast terminal, a message transceiver device, a game console, a tablet device, a medical device, a fitness device and a personal digital assistant and the like.

As shown in FIG. 19, the terminal 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the terminal 800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal 800. Examples of such data include instructions for any application or method operated on the terminal 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the terminal 800. The power supply component 806 may include a power supply management system, one or more power supplies, and other components associated with generating, managing and distributing power for the terminal 800.

The multimedia component 808 includes a screen that provides an output interface between the terminal 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some embodiments, the multimedia component 808 includes a front camera and/or a rear camera. When the terminal 800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the terminal 800. For example, the sensor component 814 may detect an open/closed state of the terminal 800, and the relative positioning of components, for example, the component is a display and a keypad of the terminal 800. The sensor component 814 may also detect a change in position of the terminal 800 or a component of the terminal 800, the presence or absence of a user in contact with the terminal 800, the orientation or acceleration/deceleration of the terminal 800 and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an acceleration sensor, a gyro sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as WiFi, 2G or 3G, or a combination thereof. In an example, the communication component 816 receives broadcast signals or broadcast associated information from an external broadcast management system via a broadcast channel. In an example, the communication component 816 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the above methods.

In an embodiment, there is also provided a non-transitory computer readable storage medium including instructions, such as a memory 804 including instructions, where the instructions are executable by the processor 820 of the terminal 800 to perform the method as described above. For example, the non-transitory computer readable storage medium may be Read Only memory (ROM), Random Access Memory (RAM), CD-ROM, magnetic tape, floppy disk, and optical data storage device and the like.

Figure 20:
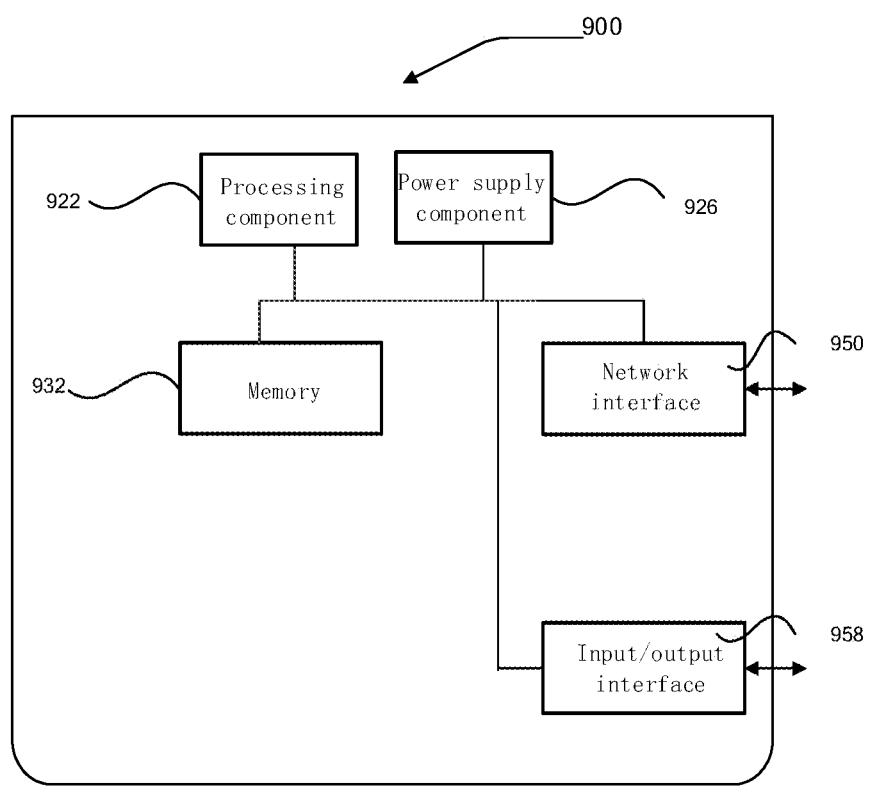
FIG. 20 is a structural schematic diagram illustrating a base station according to an embodiment of the present disclosure.

FIG. 20 is a schematic diagram illustrating a base station. As shown in FIG. 20, the base station 900 includes a processing component 922 which further includes one or more processors, and memory resources represented by a memory 932 and used to store instructions executable by the processing component 922, e.g. an application program. The application program stored in the memory 932 may include one or more modules, each of which corresponds to one group of instructions. Further, the processing component 922 is configured to execute instructions to implement the any one of the above data transmission methods.

The base station 900 may further include one power supply component 926 configured to perform power management of the base station 900, one wireless or wired network interface 950 configured to connect the base station 900 to a network, and one input/output (I/O) interface 958. The base station 900 may be operated based on an operating system stored in the memory 932, for example, Windows Server™, Mac OS X™, Unix™, Linux™, FreeBSD™ or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It should be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A data transmission method, being applied to a data transmitter, and comprising:
receiving transmission feedback for one or more Code Block Groups (CBGs) from a receiver;
transmitting one or more Transmission Blocks (TBs) based on the transmission feedback, wherein one of the one or more TBs comprises one or more retransmission CBGs and one or more initial transmission CBGs;
in response to the one of the one or more TBs being an uplink transmission TB, obtaining, based on a correspondence between a number of the one or more retransmission CBGs carried by the one of the one or more TBs and scrambling sequences, scrambled information by scrambling a first check bit sequence, wherein the first check bit sequence is generated based on the transmission feedback and Uplink Control Information (UCI); and
uplink-transmitting the UCI and the scrambled information.

2. The method of claim 1, wherein
different TBs comprise a same number of CBGs; and/or
for each of the one or more retransmission CBGs comprised in the one of the one or more TBs, the retransmission CBG and an initial transmission CBG corresponding to the retransmission CBG are same in at least one of modulation and coding scheme or code rate.

3. The method of claim 1, wherein
the one of the one or more TBs comprises an even number of the one or more retransmission CBGs and an even number of the one or more initial transmission CBGs; or
when an odd number of the one or more retransmission CBGs are to be transmitted, the one of the one or more TBs comprises an odd number of the one or more retransmission CBGs and an odd number of the one or more initial transmission CBGs.

4. The method of claim 3, wherein the one of the one or more TBs comprises the even number of the one or more retransmission CBGs and the even number of the one or more initial transmission CBGs,
wherein when an odd number of the one or more retransmission CBGs are to be transmitted, the one of the one or more TBs comprises two same retransmission CBGs, and the two same retransmission CBGs are any one of the odd number of the one or more retransmission CBGs.

5. The method of claim 4, wherein the two same retransmission CBGs are a last one of the odd number of the one or more retransmission CBGs.

6. The method of claim 1, wherein the one or more retransmission CBGs comprise a retransmission CBG retransmitted for a m-th time and a retransmission CBG retransmitted for a n-th time, wherein m and n are unequal, m is a positive integer, and n is a positive integer.

7. The method of claim 1, wherein the one or more retransmission CBGs are located before the one or more initial transmission CBGs comprised in the one of the one or more TBs.

8. A data transmission method, being applied to a retransmission receiver and comprising:
transmitting transmission feedback for one or more Code Block Groups (CBGs); and
receiving one or more Transmission Blocks (TBs) transmitted based on the transmission feedback, wherein one of the one or more TBs comprises one or more retransmission CBGs and one or more initial transmission CBGs;
receiving Uplink Control Information (UCI) and scrambled information;
obtaining one or more second check bit sequences by descrambling the scrambled information with one or more scrambling sequences;
obtaining a third check bit sequence according to the transmission feedback stored by the retransmission receiver and the UCI;
in response to at least one of the one or more second check bit sequences being consistent with the third check bit sequence, determining the scrambled information is correctly descrambled;
in response to a scrambling sequence for correctly descrambling the scrambled information being a scrambling sequence in correspondence with a number of the one or more retransmission CBGs, determining the number of the one or more retransmission CBGs comprised in the one of the one or more TBs according to the scrambling sequence for correctly descrambling the scrambled information; and
descrambling the one of the one or more TBs according to the number of the one or more retransmission CBGs.

9. The method of claim 8, further comprising:
determining, according to the transmission feedback, the one or more retransmission CBGs comprised in the one of the one or more TBs; and
determining, according to a number of CBGs and the one or more retransmission CBGs comprised in the one of the one or more TBs, the one or more initial transmission CBGs comprised in the one of the one or more TBs.

10. The method of claim 8, further comprising:
for each of the one or more retransmission CBGs comprised in the one of the one or more TBs, decoding the retransmission CBG according to a modulation and coding scheme or a code rate of an initial transmission CBG corresponding to the retransmission CBG.

11. The method of claim 8, further comprising:
when the one of the one or more TBs comprises an even number of the one or more retransmission CBGs and an even number of the one or more initial transmission CBGs, determining, in response to that the transmission feedback indicates an odd number of the one or more retransmission CBGs, that the one of the one or more TBs comprises two same retransmission CBGs; or
when the transmission feedback indicates an odd number of the one or more retransmission CBGs, determining that the one of the one or more TBs comprises an odd number of the one or more retransmission CBGs and an odd number of the one or more initial transmission CBGs.

12. The method of claim 11, wherein when the one of the one or more TBs comprises the even number of the one or more retransmission CBGs and the even number of the one or more initial transmission CBGs, determining, in response to that the transmission feedback indicates the odd number of the one or more retransmission CBGs, that the one of the one or more TBs comprises the two same retransmission CBGs comprises:
when the one of the one or more TBs comprises the even number of the one or more retransmission CBGs and the even number of the one or more initial transmission CBGs, determining, in response to that the transmission feedback indicates the odd number of the one or more retransmission CBGs, that a last retransmission CBG in the one of the one or more TBs is transmitted two times.

13. The method of claim 11, wherein the one of the one or more TBs comprises an even number of the one or more retransmission CBGs and an even number of the one or more initial transmission CBGs.

14. The method of claim 8, wherein descrambling the one of the one or more TBs according to the number of the one or more retransmission CBGs comprises:
determining one or more retransmission candidate combinations based on the number of the one or more retransmission CBGs, wherein the one or more retransmission candidate combinations comprise a combination of the one or more initial transmission CBGs corresponding to the one or more retransmission CBGs comprised in the one of the one or more TBs; and
descrambling the one of the one or more TBs based on the one or more retransmission candidate combinations.

15. The method of claim 8, further comprising:
in response to the scrambling sequence for correctly descrambling the scrambled information being not a scrambling sequence in correspondence with the number of the one or more retransmission CBGs, determining all CBGs comprised in the one or more TBs are initial transmission CBGs.

16. A communication device, comprising:
a transceiver;
a memory;
a processor, connected to the transceiver and the memory respectively and configured to control transmission and reception of the transceiver and implement operations of:
receiving transmission feedback for one or more Code Block Groups (CBGs) from a receiver;
transmitting one or more Transmission Blocks (TBs) based on the transmission feedback, wherein one of the one or more TBs comprises one or more retransmission CBGs and one or more initial transmission CBGs;
in response to the one of the one or more TBs being an uplink transmission TB, obtaining, based on a correspondence between a number of the one or more retransmission CBGs carried by the one of the one or more TBs and scrambling sequences, scrambled information by scrambling a first check bit sequence, wherein the first check bit sequence is generated based on the transmission feedback and Uplink Control Information (UCI); and
uplink-transmitting the UCI and the scrambled information.

17. A communication device, comprising:
a transceiver;
a memory;
a processor, connected to the transceiver and the memory respectively and configured to:
transmit transmission feedback for one or more Code Block Groups (CBGs); and
receive one or more Transmission Blocks (TBs) transmitted based on the transmission feedback, wherein one of the one or more TBs comprises one or more retransmission CBGs and one or more initial transmission CBGs;
receive Uplink Control Information (UCI) and scrambled information;

obtain one or more second check bit sequences by descrambling the scrambled information with one or more scrambling sequences;

obtain a third check bit sequence according to the transmission feedback stored by the retransmission receiver and the UCI;

in response to at least one of the one or more second check bit sequences being consistent with the third check bit sequence, determine the scrambled information is correctly descrambled;

in response to a scrambling sequence for correctly descrambling the scrambled information being a scrambling sequence in correspondence with a number of the one or more retransmission CBGs, determine the number of the one or more retransmission CBGs comprised in the one of the one or more TBs according to the scrambling sequence for correctly descrambling the scrambled information; and descramble the one of the one or more TBs according to the number of the one or more retransmission CBGs.

* * * * *

UNITED STATES PATENT AND TRADEMARK OFFICE
CERTIFICATE OF CORRECTION

| | | |
|---|---|---|
| PATENT NO. | : 12,199,766 B2 | Page 1 of 1 |
| APPLICATION NO. | : 17/632091 | |
| DATED | : January 14, 2025 | |
| INVENTOR(S) | : Yajun Zhu et al. | |

It is certified that error appears in the above-identified patent and that said Letters Patent is hereby corrected as shown below:

On the Title Page

On Page 2, in Item (56), under "OTHER PUBLICATIONS", in Column 2, Line 9, delete "Huawei et al.;." and insert -- Huawei et al.; --, therefor.
On Page 2, in Item (56), under "OTHER PUBLICATIONS", in Column 2, Line 10, delete "RI-1706963;, May 19, 2017 (May 19, 2017)," and insert -- R1-1706963, May 19, 2017, --, therefor.

In the Specification

In Column 4, Line 27, delete "New Generation-" and insert -- Next Generation- --, therefor.
In Column 5, Line 2, delete "Public" and insert -- Packet --, therefor.
In Column 8, Line 33, delete "c" and insert -- c; --, therefor.
In Column 11, Line 21, delete "descrambled;" and insert -- descrambled. --, therefor.
In Column 18, Line 59, delete "Identity" and insert -- Identifier --, therefor.
In Column 23, Lines 42-43, delete "the any" and insert -- any --, therefor.

In the Claims

In Column 24, Line 65, in Claim 8, delete "(CBGs); and" and insert -- (CBGs); --, therefor.
In Column 25, Line 52, in Claim 11, delete "that the" and insert -- the --, therefor.
In Column 26, Line 60, in Claim 17, delete "(CBGs); and" and insert -- (CBGs); --, therefor.

Signed and Sealed this
Eighteenth Day of March, 2025

Coke Morgan Stewart
*Acting Director of the United States Patent and Trademark Office*